United States Patent [19]
Gilbert

[11] 4,291,847
[45] Sep. 29, 1981

[54] WINCH MEANS

[76] Inventor: James C. Gilbert, 8355 Greenbrook, Southaven, Miss. 38671

[21] Appl. No.: 174,361

[22] Filed: Aug. 1, 1980

[51] Int. Cl.³ ............................................. B65H 17/46
[52] U.S. Cl. ..................................... 242/95; 254/323
[58] Field of Search .................. 242/95; 254/282, 323

[56] References Cited
U.S. PATENT DOCUMENTS

| | | | |
|---|---|---|---|
| 2,642,235 | 6/1953 | Smith | 242/95 |
| 3,099,416 | 7/1963 | Wright | 254/282 |
| 3,160,364 | 12/1964 | Bailey | 242/95 |
| 4,135,681 | 1/1979 | Cooper | 242/95 |

Primary Examiner—Edward J. McCarthy
Attorney, Agent, or Firm—Walker & McKenzie

[57] ABSTRACT

A spool-like member for being removably attached to the drive wheels of a vehicle. One end of a flexible cable is attached to the spool-like member. The other end of the cable is attached to a fixed object such as a tree or rock. Rotation of the drive wheels will cause the cable to wind around the spool-like member and will cause the vehicle to be drawn toward the fixed object. The spool-like member can be removed from the drive wheels regardless of whether the cable is fully wound onto the spool-like member or not. The drive wheels can be removed from the vehicle without removing the spool-like members from the drive wheels.

3 Claims, 4 Drawing Figures

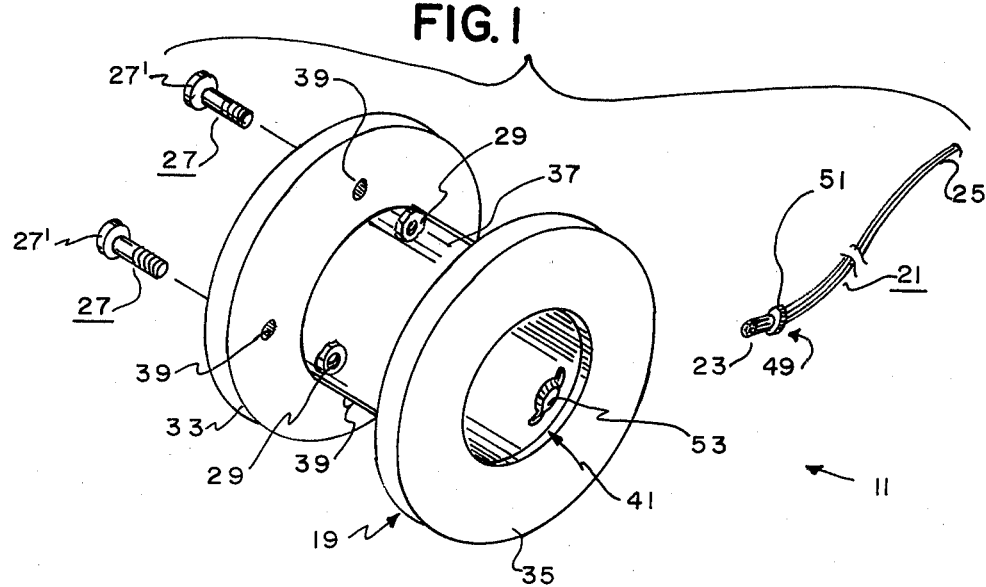
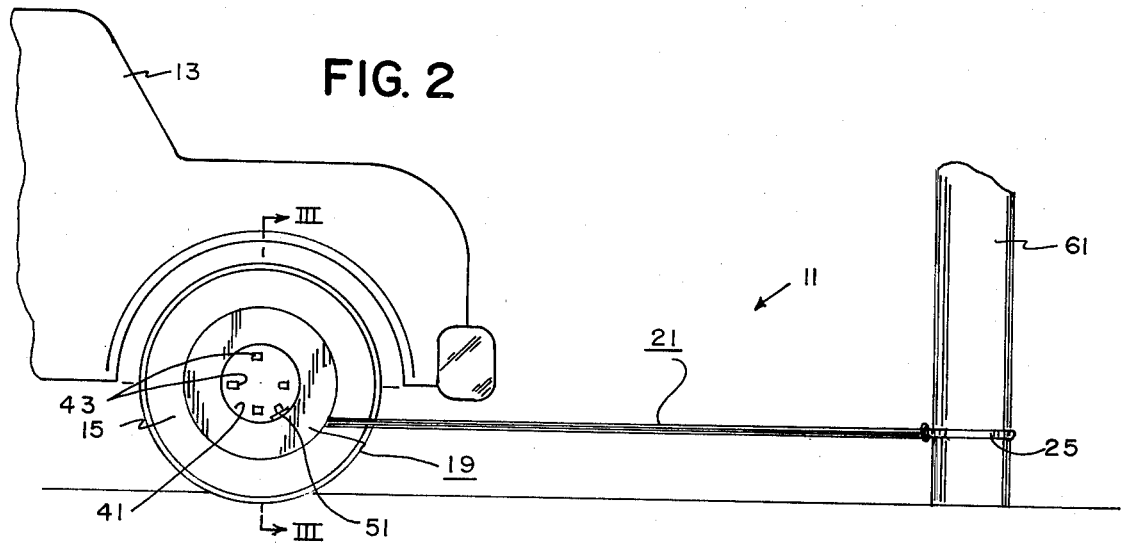
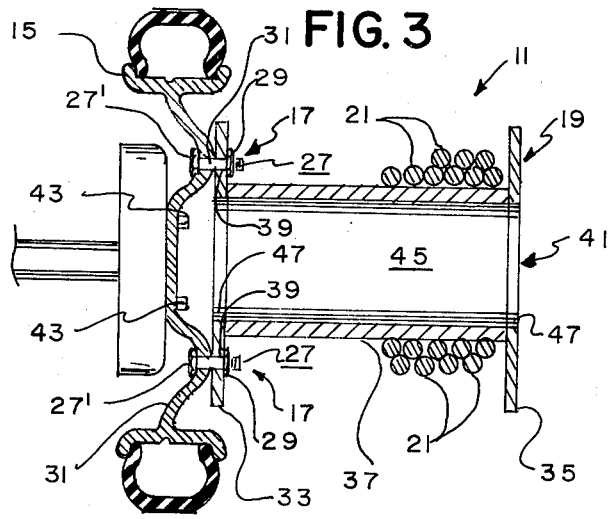
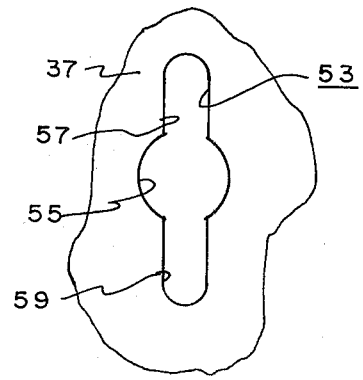

WINCH MEANS

BACKGROUND OF THE INVENTION

1. Field of the Invention

The present invention relates to means for being attached to the drive wheels of a vehicle to help in pulling that vehicle to a desired location.

2. Description of the Prior Art

Heretofore, various means have been developed for being attached to the drive wheels of a vehicle to help pull that vehicle to a desired location. See, for example, Waelti, U.S. Pat. No. 1,334,195; Sepelyak, U.S. Pat. No. 1,463,022; Finley, U.S. Pat. No. 1,495,225; Smith, U.S. Pat. No. 2,642,235; Wright, U.S. Pat. No. 3,099,416; Bailey, U.S. Pat. No. 3,160,364; Bailey, U.S. Pat. No. 3,224,704; Jack, U.S. Pat. No. 3,278,159; McCain, U.S. Pat. No. 3,392,961; and Cooper, U.S. Pat. No. 4,135,681. However, these know prior art means have not gained wide acceptance. Certain readily apparent problems with these known prior art means that might have caused their lack of wide acceptance are that they were difficult to remove from the drive wheels, require special designed features and/or tools to allow them to be removed from the drive wheels, often interfere with the removal of the drive wheels itself, etc. None of the above patents disclose or suggest the present invention.

SUMMARY OF THE INVENTION

The present invention is directed toward improving upon prior winch means for attachment to the drive wheels of a vehicle. The concept of the present invention is to provide such a winch means that is easy to attach to and remove from the drive wheels of a vehicle, that does not interfere with the removal and installation of the drive wheel from and and onto the vehicle, that is economical to manufacture and sell, that is simple to operate, and that does not require any special tools to install and/or remove.

The winch means of the present invention includes, in general, a mounting means for being fixedly attached to the drive wheel of a vehicle, a spool means for being selectively attached to the drive wheel by the mounting means for rotating with the drive wheel, and cable means having a first end for being attached to the spool means and having a second end for being selectively anchored at a desired location, rotation of the drive wheel causing the cable means to wind about the spool means and causing the vehicle to be drawn to the desired location, the spool means being capable of being disengaged from the mounting means after the cable means is fully wound onto the spool means.

BRIEF DESCRIPTION OF THE DRAWINGS

FIG. 1 is a somewhat diagrammatic, exploded pictorial view of various members of the winch means of the present invention.

FIG. 2 is a side elevational view of the winch means of the present invention shown mounted on a vehicle.

FIG. 3 is a sectional view thereof as taken on line III—III of FIG. 2.

FIG. 4 is an elevational view of a portion of the spool means of the winch means of the present invention.

DESCRIPTION OF THE PREFERRED EMBODIMENT

The winch means 11 of the present invention is used to draw or pull a vehicle 13 such as a standard automobile or the like from an initial location to a desired location. For example, the winch means 11 may be used to pull a vehicle 13 from a mudhole, snow bank, ditch, or the like in which the vehicle 13 has become stuck or stalled. The winch means 11 is for attachment to one of the drive wheels 15 of the vehicle 13 and pulls the vehicle 13 to a desired location when the drive wheels 15 rotate, regardless of whether or not the drive wheels 15 maintain traction or support with the ground or road surface. The winch means 11 includes, in general, a mounting means 17 for being fixedly and permanently attached to one of the drive wheels 15, a spool means 19 for being removably and selectively attached to the drive wheel 15 by the mounting means 17 for rotation with the drive wheel 15, and a cable means 21 having a first end 23 for being attached to the spool means 19 and having a second end 25 for being selectively anchored to the location to which it is desired to pull the vehicle 13.

The mounting means 17 preferably consists of a plurality of bolt members 27 and a plurality of coacting nut members 29 for being screwed onto the bolt members 27. Each bolt member 27 is preferably fixedly and permanently attached to the drive wheel 15 in any manner apparent to those skilled in the art. Preferably, a plurality of apertures 31 are drilled through the drive wheels 15. The bolt members 27 can then be inserted through the apertures 31 with the head portion 27' of each bolt member engaging the back of the drive wheel 15. The bolt members 27 can then be fixedly and permanently attached to the drive wheel 15 by being welded thereto or the like.

The spool means 19 preferably includes a first flange member 33, a second flange member 35, and a hub member 37 extending between the first and second flange members 33, 35. The first flange member 33 preferably has a plurality of apertures 39 therethrough for allowing the bolt member 27 of the mounting means 17 to extend therethrough. The spool means 19 can thus be fixedly attached to the drive wheel 15 merely by placing the first flange member 33 over the bolt members 27 and screwing the nut members 29 onto the outer end of the bolt members 27 thereby sandwiching the flange member 35 between the drive wheel 15 and the nut members 29.

The spool means 19 preferably has a central aperture 41 therethrough for allowing access to the standard lug bolts 43 or the like by which the drive wheel 15 are attached to the vehicle 13. Preferably, the hub member 37 is constructed of an elongated tube and has a central cavity 45 therethrough and each flange members 33, 35 has center opening 47 therethrough that substantially corresponds in diameter to the diameter of the cavity 45 through the hub member 37. For example, the cavity 45 through the hub member 37 and the opening 47 through the flange members 33, 35 may be substantially eight inches (20.32 centimeters) in diameter. The spool means 19 is preferably constructed of substantially strong rigid metal such as 0.25 inch (0.635 centimeter) thick steel stock. The hub member 37 is preferably 10 inches (25.4 centimeters) long. The flange members 33, 35 preferably have an approximately 13 inch (33.02 centimeters) outside diameter. The flange members 33, 35 can be fixedly attached to the hub member 37 in any manner apparent to those skilled in the art such as by being welded thereto.

The first end 23 of the cable means 21 may be attached to the spool means 19 in any manner apparent to those skilled in the art. For example, the first end 23 of the cable means 21 may be provided with an enlarged head 49. The enlarged head 49 may be formed in any manner apparent to those skilled in the art, such as by way of a standard cable clamp 51 being attached to the first end 23 of the cable means 21 in any typical manner. The hub member 37 may then be provided with a slot 53 having an enlarged mid portion 55 (see FIG. 4) through which the enlarged head 49 of the first end 23 of the cable means 21 can be inserted. The outer ends 57, 59 of the slot 53 are sized so as to prevent the enlarged head 49 of the first end 23 of the cable means 21 from being pulled therethrough. Thus, once the enlarged head 49 of the first end 23 of the cable means 21 has been inserted through the enlarged mid portion 55 of the slot 53 in the hub member 37 and moved to either outer end 57, 59 of the slot 53, depending on the direction of rotation of the drive wheel 15 (i.e., the enlarged head 49 should be moved to the outer end 57, 59 of the slot 53 that is opposite the direction of rotation of the drive wheel 15), the first end 23 of the cable means 21 will be securely attached to the spool means 19 so that rotation of the spool means 19 will cause the cable means 21 to be wound thereabout.

The use and operation of the present invention is quite simple. It should be noted that preferably each drive wheel of the vehicle 13 is provided with a winch means 11. Once the bolt members 27 have been fixedly attached to the drive wheel 15, the spool means 19 can be easily attached to the drive wheels 15 for rotation therewith merely by attaching the first flange member 33 of the spool means 19 to the bolt members 27 with the nut members 19 in the manner heretofore described. The first end 23 of the cable means 21 can then be attached to the spool means 19 in the manner heretofore described. The second end 25 of the cable means 21 is anchored to any fixed object such as a tree 61 or the like (see FIG. 2) that is located or passed the location to which it is desired to move the vehicle 13. The vehicle 13 is then put in gear to cause the drive wheels 15 to rotate in the direction to normally cause the vehicle 13 to move towards the tree 61, thereby causing the cable means 21 to wind about the spool means 19 and causing the vehicle 13 to be drawn toward the tree 61 to the desired location regardless of whether the drive wheels 15 are in gripping contact with the ground or other supporting surface. Once the vehicle 13 has been drawn to the desired location, the spool means 19 can be easily removed from the drive wheel 15 without requiring the cable means 21 to be removed even though the cable means 21 may be fully wound onto the spool means 19, and without requiring any special tools or the like. This result is due to the fact that the bolt members 27 and nut members 29 of the mounting means 17 are spaced outward of the hub member 37 a distance sufficient to allow access to the nut members 29 even when the cable means 21 is fully wound about the hub member 37. Because of the distance between the first and second flange members 33, 35, access to the nut members 29 is provided without requiring the second flange member 35 to be provided with access holes or the like. It should be noted that in case of a flat or the like, the drive wheels 15 can be removed from the vehicle 13 while the winch means 11 is mounted thereon if desired because of the center aperture 41 which allows access to the lug bolts 43 that attach the drive wheels 15 to the vehicle 13.

Although the invention has been described with respect to a preferred embodiment thereof and a preferred use therefore, it is not to be so limited since changes and modifications may be made therein which are within the full intended scope of the invention.

I claim:

1. A winch means for attachment to a drive wheel of a vehicle and for use in drawing said vehicle to a desired location, said winch means comprising:
   (a) mounting means for being fixedly attached to said drive wheel, said mounting means including a plurality of bolt members fixedly attached to said drive wheel and including a plurality of nut members for being screwed onto said bolt members;
   (b) spool means for being selectively attached to said drive wheel by said mounting means for rotation with said drive wheel, said spool means including a first and second flange members and a hub member extending between said first and second flange members, said first flange member of said spool means having a plurality of apertures therethrough for allowing said bolt members of said mounting means to extend therethrough and for allowing said spool means to be attached to said drive means with said bolt members of said mounting means passing through said apertures in said first flange member and with said first flange member sandwiched between said drive wheel and said nut members of said mounting means; and
   (c) cable means having a first end for being attached to said spool means and having a second end for being selectively anchored to said desired location, rotation of the drive wheel causing said cable means to wind about said spool means and causing said vehicle to be drawn to said desired location, said spool means being capable of being disengaged from said mounting means after said cable means is fully wound onto said spool means.

2. The winch means of claim 1 in which said drive wheel is mounted to said vehicle by a plurality of lug bolts, and in which said spool means has a central aperture for allowing access to said lug bolts when said spool means is attached to said drive wheel.

3. The winch means of claim 2 in which is included a second winch means for being attached to a second drive wheel of said vehicle.

* * * * *